United States Patent [19]
Kusano et al.

[11] Patent Number: 6,148,137
[45] Date of Patent: Nov. 14, 2000

[54] VIDEO TAPE REPRODUCING APPARATUS CAPABLE OF PREVENTING INFLUENCE OF NOISE-BAR

[75] Inventors: Takahiro Kusano, Yokohama; Hideyuki Hagino, Kumagaya, both of Japan

[73] Assignee: Kabushiki Kaisha Toshiba, Kawasaki, Japan

[21] Appl. No.: 08/821,301

[22] Filed: Mar. 20, 1997

[30] Foreign Application Priority Data

Mar. 22, 1996 [JP] Japan .................................. 8-066754

[51] Int. Cl.$^7$ ...................................................... H04N 5/94
[52] U.S. Cl. .............................. 386/51; 386/68; 386/113
[58] Field of Search .................................. 386/2, 3, 6–8, 386/21, 47, 49, 51, 68, 76, 77, 81, 82, 113, 114, 115, 116; H04N 5/76, 5/94, 5/92, 9/79

[56] References Cited

U.S. PATENT DOCUMENTS

| 4,531,162 | 7/1985 | Tokumitsu | 386/76 |
| 4,594,618 | 6/1986 | Kozuki et al. | 360/73 |
| 5,208,677 | 5/1993 | Nishimura | 386/77 |

*Primary Examiner*—Thai Tran
*Attorney, Agent, or Firm*—Oblon, Spivak, McClelland, Maier & Neustadt, P.C.

[57] ABSTRACT

A noise-bar period detection circuit detects a noise bar period in response to a low-frequency carrier wave FM signal contained in a signal reproduced by a video head when a video tape is reproduced in a special mode so as to output a noise-bar detection signal. A reproduced-signal processing circuit including a clamp circuit, an AGC circuit and the like maintains normal voltage immediately before the noise bar period in response to the noise-bar detection signal output from the noise-bar period detection circuit. Therefore, restoration to a normal state can be performed immediately after the noise bar period.

24 Claims, 9 Drawing Sheets

VIDEO TAPE REPRODUCING APPARATUS CAPABLE OF PREVENTING INFLUENCE OF NOISE-BAR

BACKGROUND OF THE INVENTION

The present invention relates to a home-use video tape recorder (VTR), and more particularly to a video tape recorder having a function for detecting a noise-bar period generated in a special reproduction mode, called "high-speed picture search" for reproducing an image at high speed, so as to control various circuits for processing reproduced signals.

A home-use VTR for recording/reproducing an NTSC television signal is structured such that a brightness signal component in a video signal is converted into a low-frequency carrier wave FM signal having a low-frequency carrier wave. Moreover, a color signal component of the video signal is converted into a low-frequency color signal having a low frequency, for example, 629 KHz which is lower than the FM frequency of the brightness signal. The converted low-frequency color signal is superimposed on the low-frequency carrier wave FM signal so as to be magnetically recorded on a video tape. In this case, two video heads provided for a rotating cylinder are operated to record the foregoing superimposed signals on two adjacent video tracks of the video tape. As a recording method, for example, a guard band-less recording method is employed in order to raise the recording density.

Figure 10:
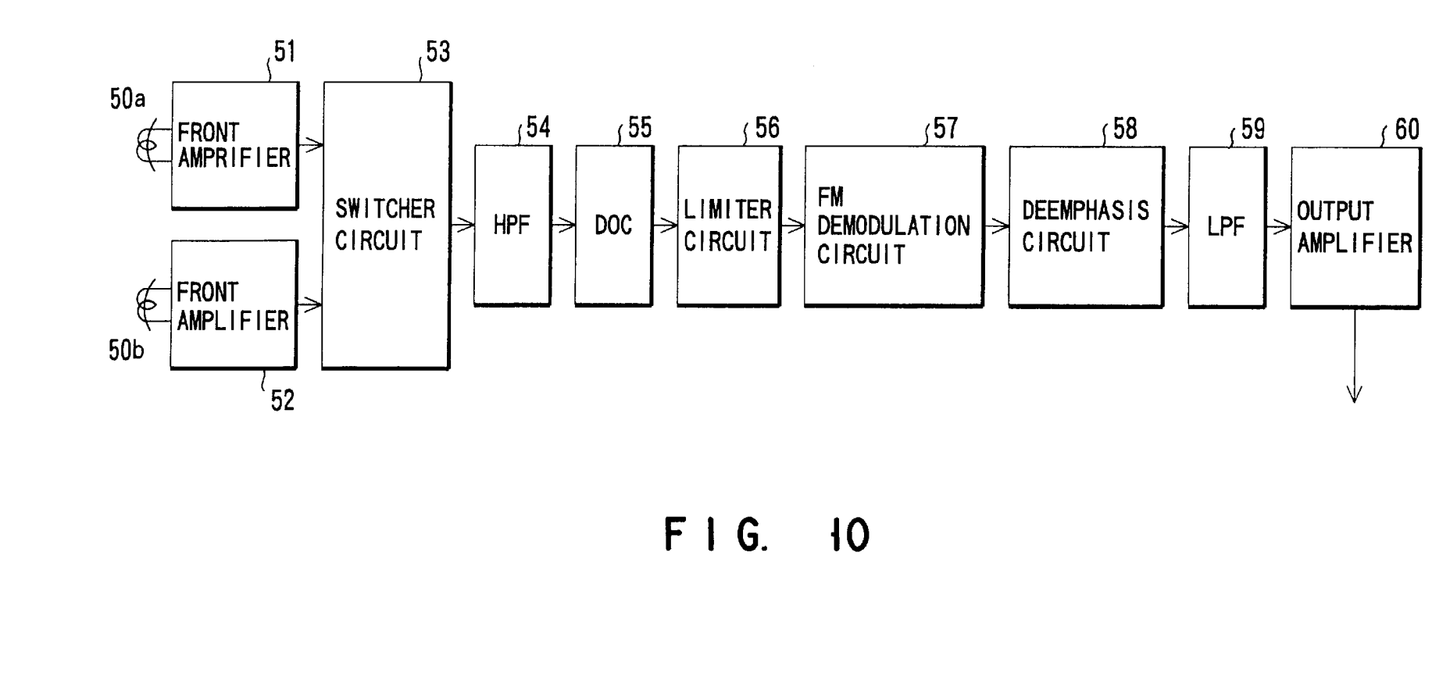
FIG. 10 is a block diagram showing a portion of a brightness signal reproducing system of a conventional home-use VTR.

FIG. 10 is a diagram showing a portion of a brightness signal reproducing system of a conventional VTR.

Signals respectively reproduced by two video heads 50a and 50b are amplified by front amplifiers 51 and 52, and then alternately selected by a switcher circuit 53 so as to be formed into a continuous signal.

An output signal from the switcher circuit 53 is supplied to a HPF (High-Pass Filter) 54 so that a color signal component (a low-frequency converted color signal) contained in the output signal is removed and a brightness signal component (a low-frequency carrier wave FM signal) is extracted. Drop out of the low-frequency carrier wave FM signal is compensated by a DOC (Drop-Out Compensator) 55.

When the DOC 55 has detected drop out generated in the reproduced signal, the DOC 55 substitutes a low-frequency carrier wave FM signal forward by 1 H (horizontal scanning period) for the drop out portion by using line correlation of a video image.

The level change of an output signal from the DOC 55 is limited by a limiter circuit 56, and then the output signal is FM-demodulated by a FM demodulation circuit 57 so that the brightness signal component is extracted. The characteristic of the brightness signal component is corrected by a de-emphasis circuit 58, and then the carrier wave component of the FM signal is removed by a low-pass filter (LPF) 59. Moreover, the transference time is aligned with that of the color signal reproducing system, and then the brightness signal component is supplied to an output amplifier 60.

A usual VTR is structured to have a special reproduction mode, such as a still-image reproduction mode and a high-speed picture search (speed search) mode, in which the reproducing video head traces a plurality of video tracks on the video tape as it traverses the video tracks. Therefore, reproduced outputs from the plural video tracks are alternately output, thus causing constriction to be generated in the reproduced FM signal. As a result, the amplitude of the reproduced FM signal is reduced and, therefore, the S/N ratio deteriorates. Thus, bar-shape noise, called noise bars or noise bands, is generated on the displayed image.

As a countermeasure to remove the noise bar, drop out compensation has been employed with which the period, in which the envelope of the reproduced FM signal has been reduced, is replaced by a reproduced FM signal forward by 1 H. However, the drop out compensation has the following problems:

FIGS. 11A to 11D are graphs showing examples of the actual noise bar period, the envelope waveform of the reproduced FM signal, the drop-out detection output waveform from the DOC and the input waveform to the clamp circuit.

(1) The drop out compensation must be performed quickly. In general, delay time caused from detection of the drop out is set to be not longer than 1 $\mu$s and delay time involved to return to the usual operation mode is set to be not longer than several $\mu$s.

Figure 11A:
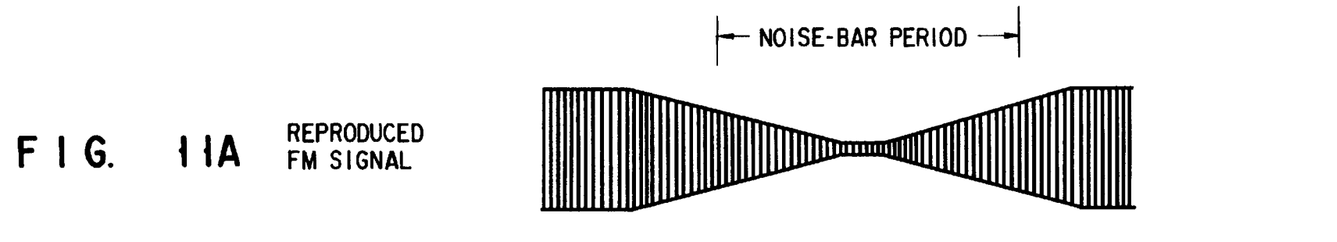
FIGS. 11A to 11D are graphs showing waveforms to explain an example of the operation of the brightness signal reproducing system shown in FIG. 10.
Figure 11B:
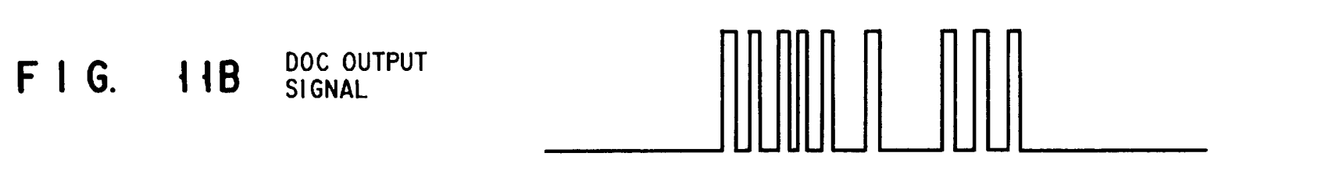

On the other hand, the reproduced FM signal is, as shown in FIG. 11A, irregularly changed in the noise bar period because the portion of the noise component is enlarged. Therefore, a signal for compensating the drop out is output from the DOC in the noise bar period, the signal being, as shown in FIG. 11B, composed of a plurality of pulses which are randomly output. That is, the conventional DOC is not structured to output one pulse which includes the noise-bar period.

(2) The reproduced FM signal or the brightness signal obtained by FM-demodulating the reproduced FM signal, each of which has been obtained in the noise-bar period is not a normal signal. Thus, the operations of the circuits in the reproducing system are adversely affected.

Figure 11C:
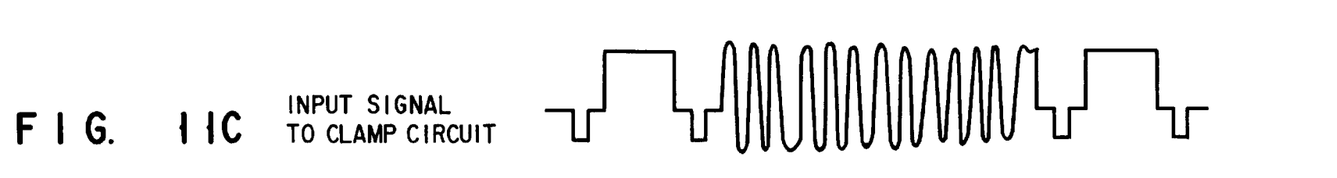
Figure 11D:
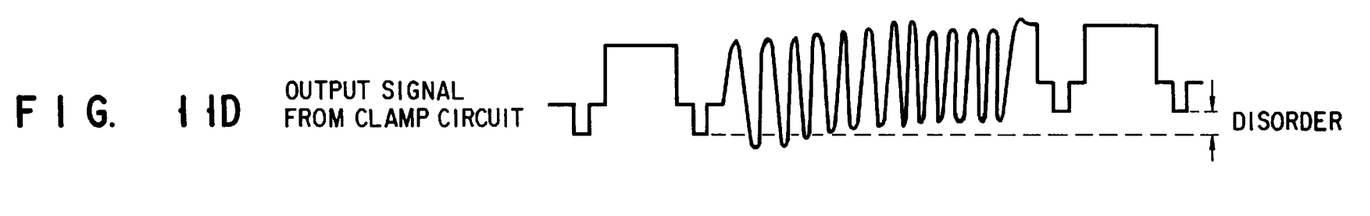

For example, a clamp circuit for clamping the level of a synchronizing signal added to the brightness signal, as shown in FIG. 11C, unintentionally clamps the brightness signal component with a lower level of the noise waveform if a noise waveform, the potential of which is made to be lower than the leading end (sync. tip) of the synchronizing signal, is included in the brightness signal component, as shown in FIG. 11D. Thus, there arises a problem in that, for example, the clamp potential of the synchronizing signal is disordered.

An automatic gain control (AGC) circuit for automatically adjusting the gain of an amplifier while monitoring the level of the reproduced signal involves unintentional shift of the optimum adjustment point attributable to an abnormal signal generated in the noise-bar period. Therefore, when the noise-bar period has been ended and the mode is returned to the normal operation mode, an excessively long time is required to return to the optimum adjustment point.

The demodulation sensitivity of the FM demodulation circuit and the like is controlled by a determination output from a mode determination circuit for determining whether the mode is the SVHS mode or the NVHS mode. However, the determination output from the mode determination circuit in the noise-bar period is not a reliable output. Therefore, the FM demodulation circuit cannot normally be controlled.

If noise having a large amplitude is generated in the noise-bar period, there sometimes arises a problem in that generated noise exceeds the dynamic range of a circuit in the rear of the circuit in which noise above has been generated.

Although the reproducing system of the conventional VTR is arranged to compensate drop out in accordance with a drop-out detection output in the noise-bar period, it suffers from a problem in that the operations of the circuits in the reproducing system are adversely affected because the reproduced FM signal or a brightness signal obtained by FM-demodulating the reproduced FM signal is not a normal signal.

BRIEF SUMMARY OF THE INVENTION

An object of the present invention is to provide an apparatus for reproducing a video tape which is capable of accurately detecting a noise-bar period and stabilizing and making accurate the operations of circuits in a reproducing system thereof.

The foregoing object of the present invention can be achieved by the following structure:

That is, according to the present invention, there is provided a video tape reproducing apparatus comprising:

a noise-bar period detection circuit for detecting a period of a noise bar in response to a low-frequency carrier wave FM signal contained in a signal reproduced by a video head, the noise-bar period detection circuit being structured to output a noise-bar detection signal corresponding to the period of the noise bar; and at least one reproduced-signal processing circuit, in the period of the noise bar, controlled in response to the noise bar detection signal output from the noise-bar period detection circuit.

Since the present invention enables the noise-bar period to be detected accurately, the operations of the circuits in the reproducing system can be stabilized and made accurate in the noise-bar period.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Referring to the drawings, embodiments of a video tape reproducing apparatus according to the present invention will now be described.

Figure 1:
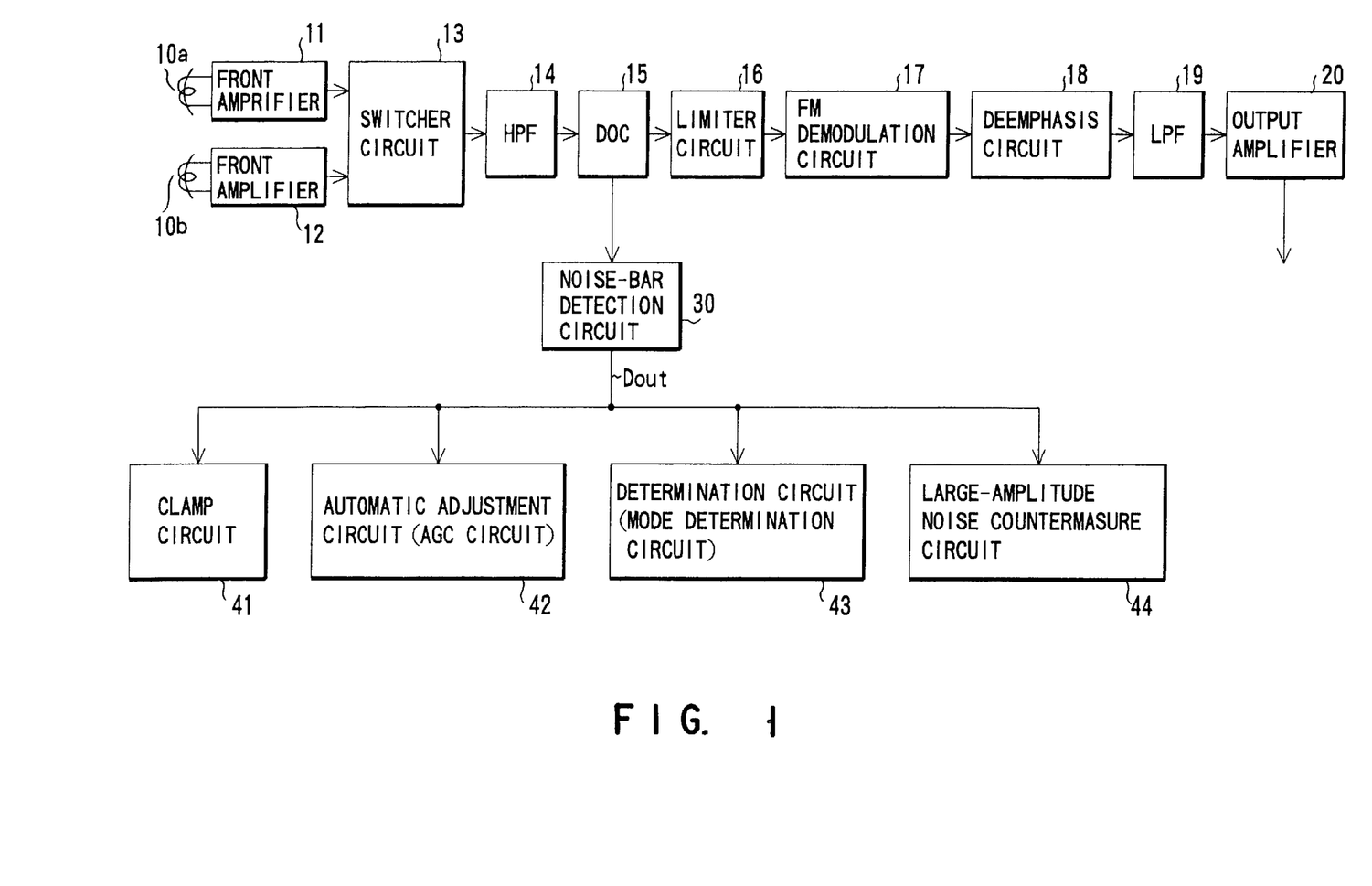
FIG. 1 is a block diagram showing a portion of a brightness signal reproducing system of a home-use VTR according to a first embodiment of a video tape reproducing apparatus according to the present invention.

FIG. 1 is a diagram showing a portion of a brightness signal reproducing system of an NTSC home-use VTR according to a first embodiment of the present invention.

Signals respectively reproduced by two video heads 10a and 10b are amplified by front amplifiers 11 and 12, and then alternately selected by a switcher circuit 13 so as to be formed into a continuous signal.

An output signal from the switcher circuit 13 is supplied to a HPF 14. The HPF 14 removes a color signal component (converted low-frequency color signal) and extracts a brightness signal component (low-frequency carrier wave FM signal). Drop out of the low-frequency carrier wave FM signal is compensated by a DOC (Drop-Out Compensator) 15.

Level change of the output signal from the DOC 15 is limited by a limiter circuit 16, and then the FM-demodulated by an FM demodulation circuit 17 so that the brightness signal component is extracted. The characteristic of the brightness signal component is corrected by a de-emphasis circuit 18, and then the carrier wave component of the FM signal is removed by a LPF 19. Moreover, the transference time alignment with a color signal reproducing system is performed, and then the brightness signal component is supplied to an output amplifier 20.

The DOC 15 is structured to substitute a low-frequency carrier wave FM signal forward by 1 H when the DOC 15 has detected drop out generated in the reproduced signal.

Figure 2:
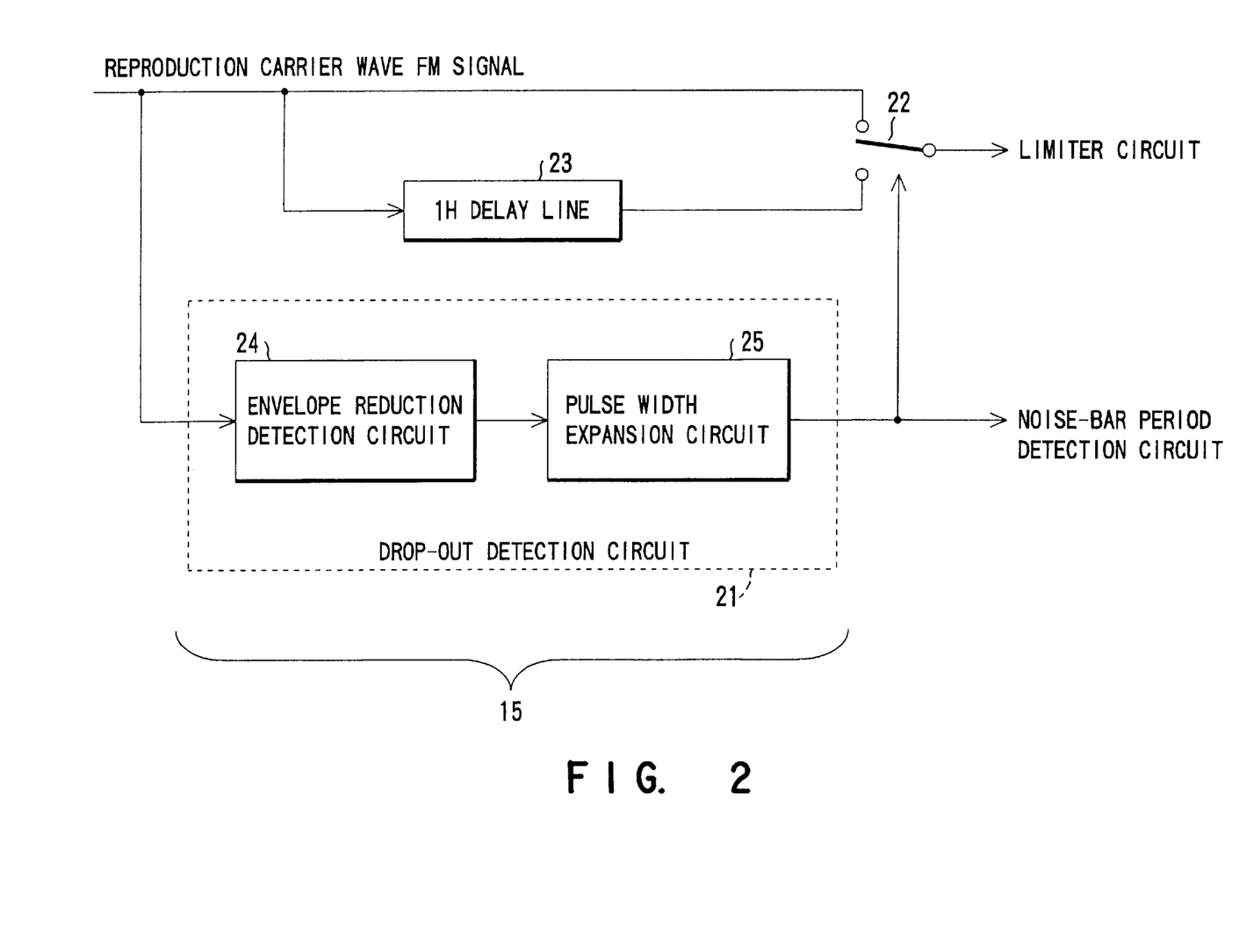
FIG. 2 is a circuit diagram showing an example of a drop-out compensation circuit (a DOC) shown in FIG. 1.

FIG. 2 is a diagram showing an example of the DOC 15. The DOC 15 is structured to branch the reproduced low-frequency carrier wave FM signal into first to third signals. The first branched signal is supplied to a drop-out detection circuit 21, the second branched signal is as it is supplied to one of input terminals of a 2-input switch circuit 22, and the third branched signal is allowed to pass through a 1 H delay line 23 and then supplied to another input terminal of the 2-input switch circuit 22. The 2-input switch circuit 22 is controlled to be switched on/off in response to a drop-out detection signal transmitted from the drop-out detection circuit 21. That is, the 2-input switch circuit 22 selects and outputs supplied low-frequency carrier wave FM signal in a period in which the drop-out detection signal is not generated. In a period in which the drop-out detection signal is being generated, the 2-input switch circuit 22 selects and outputs an output signal from the 1 H delay line 23.

The drop-out detection circuit 21 is composed of an envelope reduction detection circuit 24 and a pulse-width elongation circuit 25. The envelope reduction detection circuit 24 detects a period in which the envelope of the reproduced low-frequency carrier wave FM signal is lower than a predetermined amplitude to output a pulse signal. The pulse-width elongation circuit 25 elongates the trailing edge of the output pulse signal from the envelope reduction detection circuit 24 by 1 H or longer.

Moreover, as shown in FIG. 1, a noise-bar-period detection circuit 30 for detecting a noise-bar period generated in a special reproduction mode of the VTR is connected to an output terminal of the DOC 15. The noise-bar-period detection circuit 30 is structured to output a noise-bar detection signal in response to an output signal from the DOC 15 so as to control at least one reproduced-signal processing circuit in the VTR reproducing system.

The reproduced-signal processing circuit includes, for example, a clamp circuit 41 for clamping the level of a synchronizing signal of the brightness signal component in an RF converter; various automatic adjustment circuits 42 including an AGC circuit; various determination circuits 43 including a mode determination circuit for determining whether the mode is the SVHS mode or the NVHS mode; and a large amplitude noise countermeasure circuit 44 including, for example, a clip circuit. An output signal from the noise-bar-period detection circuit 30 is used to control the operations of the foregoing circuits forming the reproduced-signal processing circuit in such a manner that influences on the above-mentioned circuits during the noise-bar period can be prevented or reduced.

When a next pulse signal has been supplied from the envelope reduction detection circuit 24 to the noise-bar-period detection circuit 30 in a period in which the pulse-width elongation circuit 25 forming the drop-out detection circuit 21 of the DOC 15 is extending the pulse width, the noise-bar-period detection circuit 30 is structured to extend the pulse width by using the trailing edge of the new pulse signal as a reference.

The structure of the noise-bar-period detection circuit 30 may be formed to receive the drop-out detection signal to shape the waveform of the signal above to substantially accurately detect the noise-bar period and output the noise-bar detection signal.

As an alternative to this, the noise-bar-period detection circuit 30 may be structured such that a circuit for detecting the noise-bar period in accordance with the envelope waveform of the reproduced low-frequency carrier wave FM signal or a circuit for digitally detecting the noise-bar period is employed to output the noise-bar detection signal.

Figure 3:
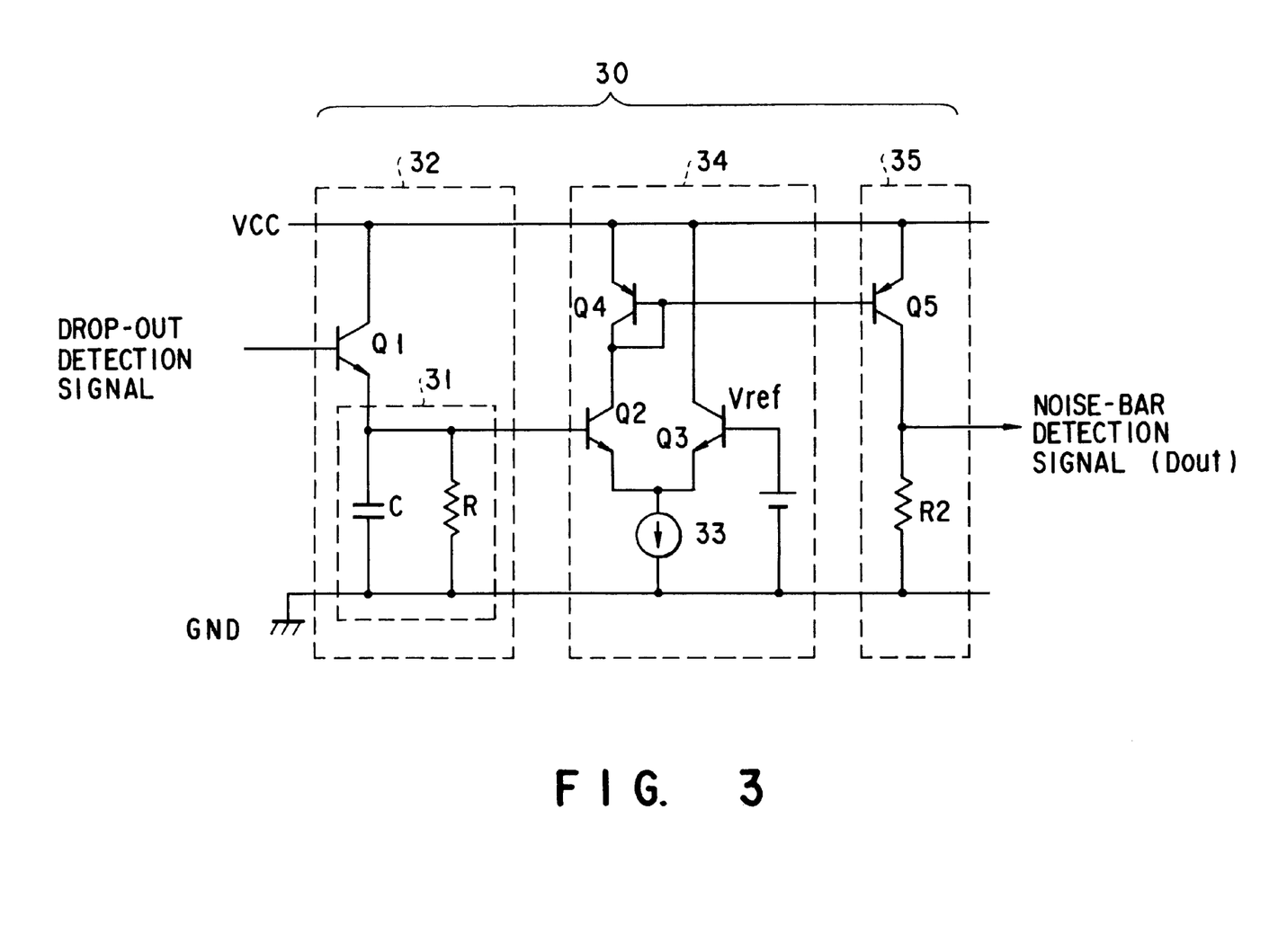
FIG. 3 is a circuit diagram showing an example of the noise-bar period detection circuit shown in FIG. 1.

FIG. 3 is a diagram showing an example of the noise-bar-period detection circuit 30 shown in FIG. 1.

Referring to FIG. 3, a collector of an NPN type first transistor Q1 is connected to a node to which power supply voltage VCC is supplied. A base of the first transistor Q1 is supplied with the drop-out detection signal from the DOC 15. A time-constant circuit 31 formed by, in parallel, connecting a capacitor C and a resistor R is connected between the emitter of the first transistor Q1 and a node to which ground potential GND is supplied. The first transistor Q1 and the time-constant circuit 31 form an integration circuit 32.

An output node of the time-constant circuit 31 is connected to a base of an NPN second transistor Q2. An emitter of an NPN third transistor Q3 is commonly connected to an emitter of the second transistor Q2. Reference potential Vref is supplied to a base of the third transistor Q3. A constant current source 33 is connected between emitters of the second and third transistors Q2 and Q3, forming a differential pair, and the ground node. A collector of the third transistor Q3 is connected to a power supply node. A portion between an emitter and a collector of a PNP fourth transistor Q4 is connected between the power supply node and a collector of the second transistor Q2. The fourth transistor Q4 acts as a load for the second transistor Q2. A base and a collector of the fourth transistor Q4 are connected to each other. The second and third transistors Q2 and Q3, forming the differential pair, the constant current source 33 and the fourth transistor Q4 form a voltage comparison circuit 34.

A base of the fourth transistor Q4 is connected to a base of a PNP fifth transistor Q5. A collector of the fifth transistor Q5 is connected to the power source node. A resistor R2 is connected between an emitter of the fifth transistor Q5 and the ground node. The fifth transistor Q5 and the resistor R2 form an amplifier 35. An output node of the amplifier 35, that is, a series connection node of the fifth transistor Q5 and the resistor R2 outputs the noise-bar detection signal.

Figure 4:
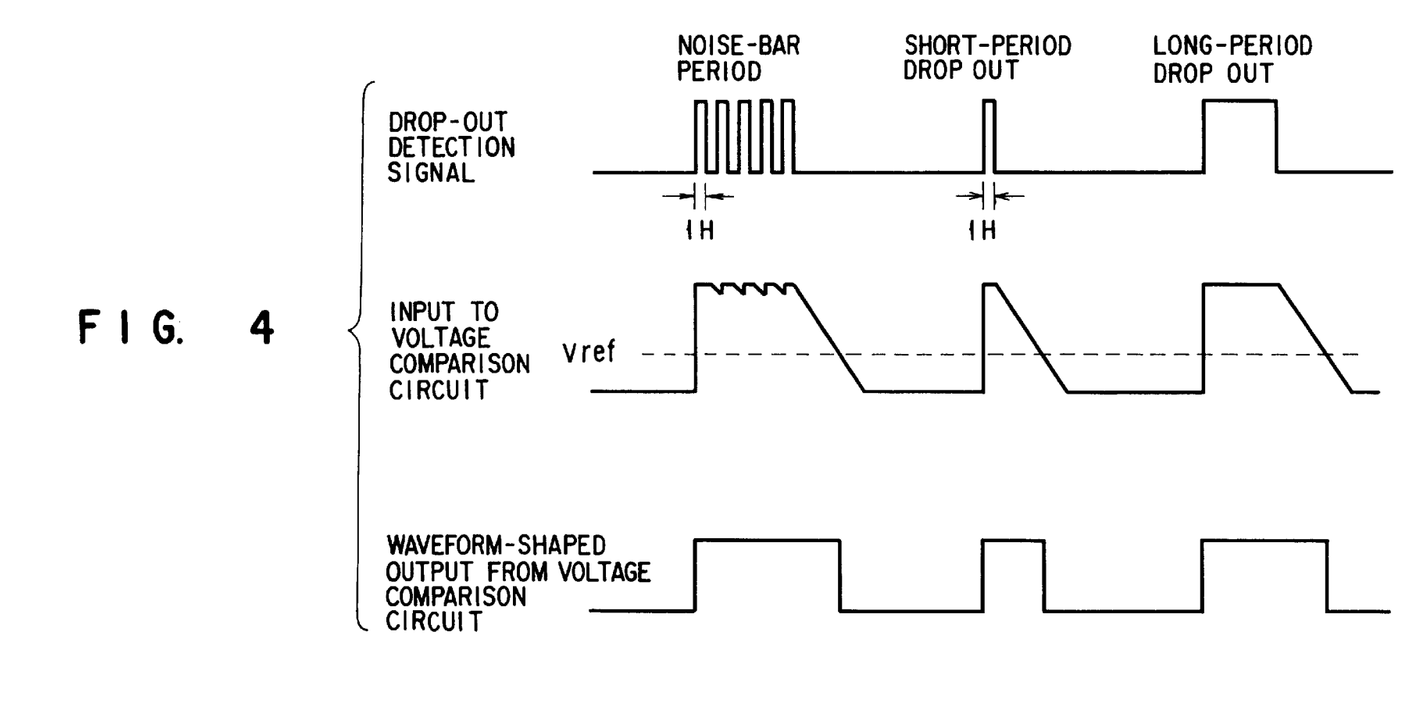
FIG. 4 is a graph showing waveforms to explain an example of the operation of the noise-bar period detection circuit shown in FIG. 3.

The operation of the noise-bar-period detection circuit 30 shown in FIG. 3 will now be described with reference to waveforms shown in FIG. 4.

The DOC 15 outputs a short time drop-out detection signal having a short time width, for example, a short time width of about 1 H=64 $\mu$s when it detects the drop out for a short time. On the other hand, the DOC 15 outputs a long time drop-out detection signal having a long time width when it detects the drop out for a long time. Moreover, the DOC 15 randomly outputs short time drop-out detection signals plural times when it detects the noise-bar period. Therefore, a pulse train is output from the DOC 15 when it detects the noise-bar period.

The drop-out detection signal output from the DOC 15 is integrated by the integration circuit 32, and then the waveform of the drop-out detection signal is shaped by the voltage comparison circuit 34. Then, the drop-out detection signal is allowed to pass through the amplifier 35, and then it is output. Since the pulse intervals of the drop-out detection signals output from the DOC 15 when the noise-bar period is detected are tens of $\mu$s in the foregoing case, the attack time in the integration circuit 32 must be satisfactorily high speed and the recovery time must be a time constant longer than the pulse intervals.

Since the attack time in the integration circuit 32 is determined in accordance with the first transition time of the first transistor Q1, the attack time is made to be satisfactory high speed. The recovery time which is determined by time constant CR of the integration circuit 32 is made to be satisfactory long by setting the time constant CR to be 1 H or longer. As described above, the attack time of the integration circuit 32 is satisfactory high speed and the recovery time of the integration circuit 32 has a time constant not shorter than 1 H so that the noise-bar period is stably detected.

Since the video tape reproducing apparatus shown in FIG. 1 has the structure such that the noise-bar-period detection circuit 30 is able to accurately detect the noise-bar period generated in the special reproduction mode of the VTR as described above, the output denoting the result of detection of the noise-bar period is used to control the clamp circuit 41, the various automatic adjustment circuits 42, the various determination circuits 43 and the large amplitude noise countermeasure circuit 44 of the VTR reproducing system. Thus, a problem which arises due to an abnormal signal generated in the noise-bar period can be solved so that the operations of the circuits in the reproducing system are stabilized and performed accurately.

Figure 5:
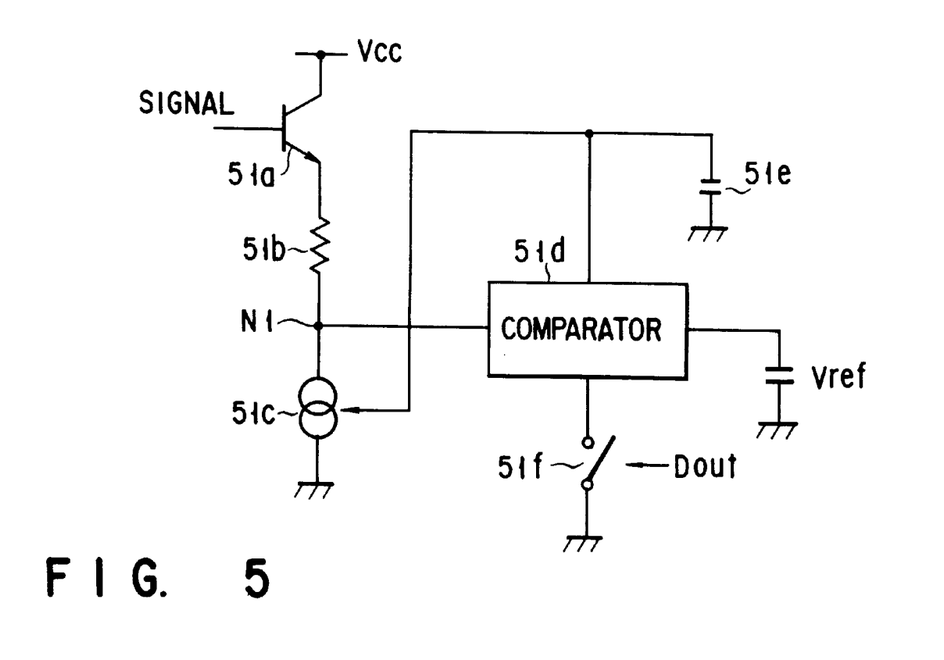
FIG. 5 is a circuit diagram specifically showing the clamp circuit shown in FIG. 1.

FIG. 5 is a diagram showing an example of the clamp circuit 41. The clamp circuit 41 includes a transistor 51a having a collector to which power supply voltage Vcc is supplied. On the other hand, the reproduced FM signal is supplied to the base of the transistor 51a. An emitter of the transistor 51a is grounded through a resistor 51b and a variable current source circuit 51c. A comparator 51d subjects the voltage of connection node N1 between the resistor 51b and the variable current source circuit 51c and reference voltage Vref to a comparison to accumulate comparison outputs in a capacitor 51e. Moreover, the comparator 51d controls the variable current source circuit 51c. A switch circuit 51f for controlling the operation of the comparator 51d is connected to the comparator 51d. The switch circuit 51f is controlled in response to output signal Dout from the noise-bar-period detection circuit 30.

In the noise-bar period, the switch circuit 51f of the clamp circuit 41 is switched off in response to the output signal Dout from the noise-bar-period detection circuit 30 so that the comparing operation of the comparator 51d is interrupted. Therefore, the capacitor 51e maintains the normal clamp potential immediately before the noise-bar period so that the variable current source circuit 51c is controlled by the normal clamp potential maintained by the capacitor 51e. That is, since the clamping operation of the clamp circuit 41 is interrupted in the noise-bar period, any erroneous operation at the leading end of the noise waveform can be prevented. Therefore, even if a noise waveform, which is made to be lower than the sync. chip potential, is superimposed on the brightness signal component, a problem that the clamp potential of the synchronizing signal level is disordered can be prevented, as shown in FIG. 11C.

Figure 6:
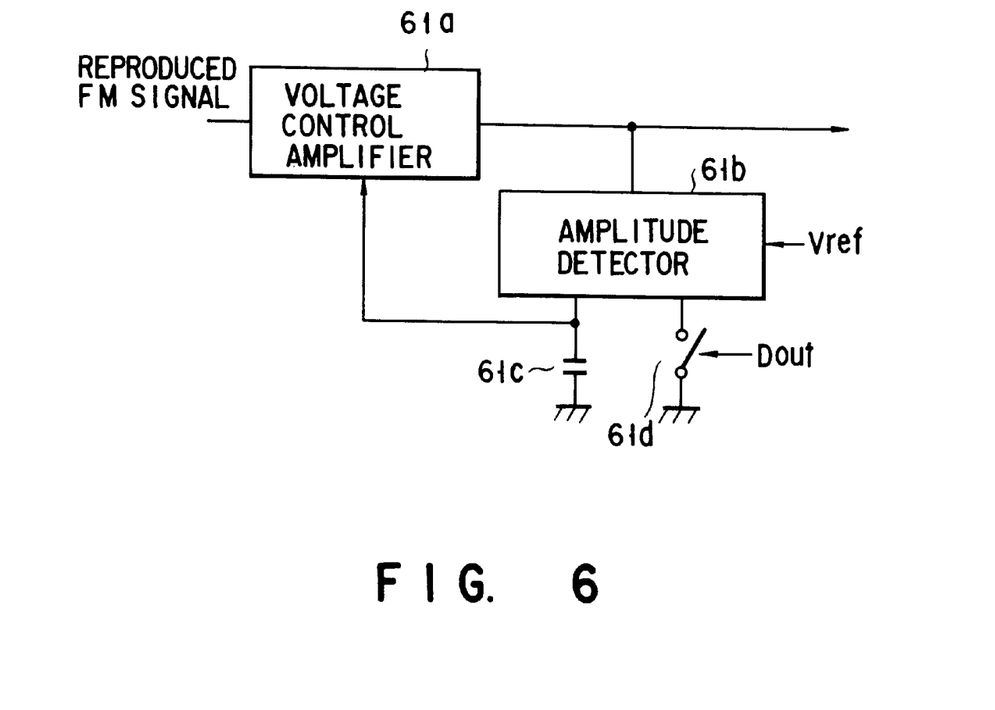
FIG. 6 is a circuit diagram specifically showing the AGC circuit shown in FIG. 1.

FIG. 6 is a diagram showing an example of the AGC circuit of the various automatic adjustment circuits 42. The AGC circuit is structured to automatically adjust the gain of the amplifier while monitoring the level of, for example, the reproduced signal. The foregoing reproduced FM signal is supplied to a voltage control amplifier 61a. An input terminal of a amplitude detector 61b is connected to an output terminal of the voltage control amplifier 61a. The amplitude detector 61b detects the amplitude of the reproduced FM signal output from the voltage control amplifier 61a in accordance with the output voltage from the voltage control amplifier 61a and the reference voltage Vref to control the voltage control amplifier 61a in response to the detection output signal and accumulate detection output signal in the capacitor 61c. A switch circuit 61d for controlling the operation of the amplitude detector 61b is connected to the amplitude detector 61b. The switch circuit 61d is controlled in response to the output signal Dout from the noise-bar-period detection circuit 30.

In the noise-bar period, the switch circuit 61d of the AGC circuit is switched off in response to the output signal Dout from the noise-bar-period detection circuit 30 so that the detection operation of the amplitude detector 61b is interrupted. Therefore, the capacitor 61c maintains the normal control signal level immediately realized immediately before the noise-bar period. That is, since the control operation, which is performed by the AGC circuit, is interrupted in the noise-bar period, the normal control signal level (the optimum adjustment level) realized immediately before the noise-bar period can be maintained. Therefore, a problem that an excessively long time is required to restore the level to the optimum adjustment level when the restoration from the noise-bar period to the normal operation mode is performed can be solved.

Figure 7:
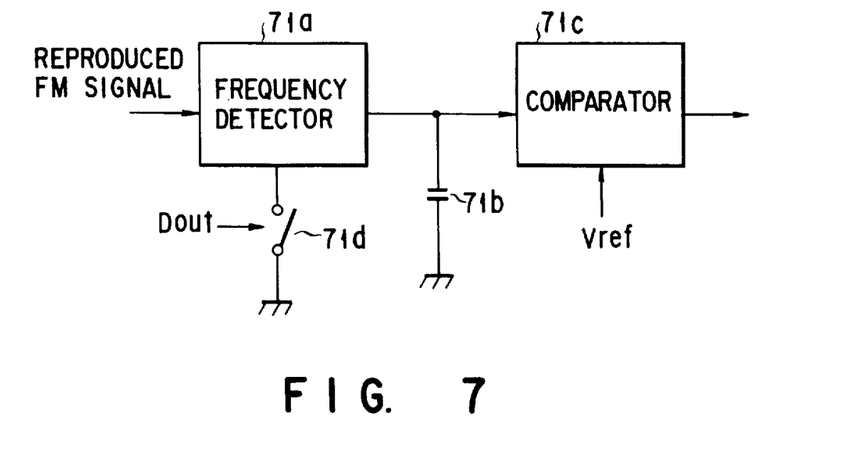
FIG. 7 is a circuit diagram specifically showing the mode determination circuit shown in FIG. 1.

FIG. 7 is a diagram showing an example of the mode determination circuit for determining whether the mode is, for example, the SVHS mode or the NVHS mode. The reproduced FM signal is supplied to a frequency detector 71a. The frequency detector 71a outputs change in the detected frequency as change in the voltage. The output voltage from the frequency detector 71a is accumulated and supplied to a comparator 71c. The comparator 71c determines whether the output voltage from the frequency detector 71a is voltage in the SVHS mode or the NVHS mode in accordance with the reference potential Vref. A switch circuit 71d for controlling the operation of the frequency detector 71a is connected to the frequency detector 71a. The switch circuit 71d is controlled in response to the output signal Dout from the noise-bar-period detection circuit 30.

In the noise-bar period, the switch circuit 71d of the frequency detector 71a is switched off in response to the output signal Dout from the noise-bar-period detection circuit 30 so that the detection operation of the frequency detector 71a is interrupted. Therefore, the comparator 71c maintains the voltage corresponding to the SVHS mode or the NVHS mode realized immediately before the noise-bar period. That is, since the comparator 71c maintains the normal determination output immediately before the noise-bar period, any erroneous determination can be prevented. Therefore, the demodulation sensitivity of the FM demodulation circuit 17 and the like can be controlled normally even in the noise-bar period.

Figure 8:
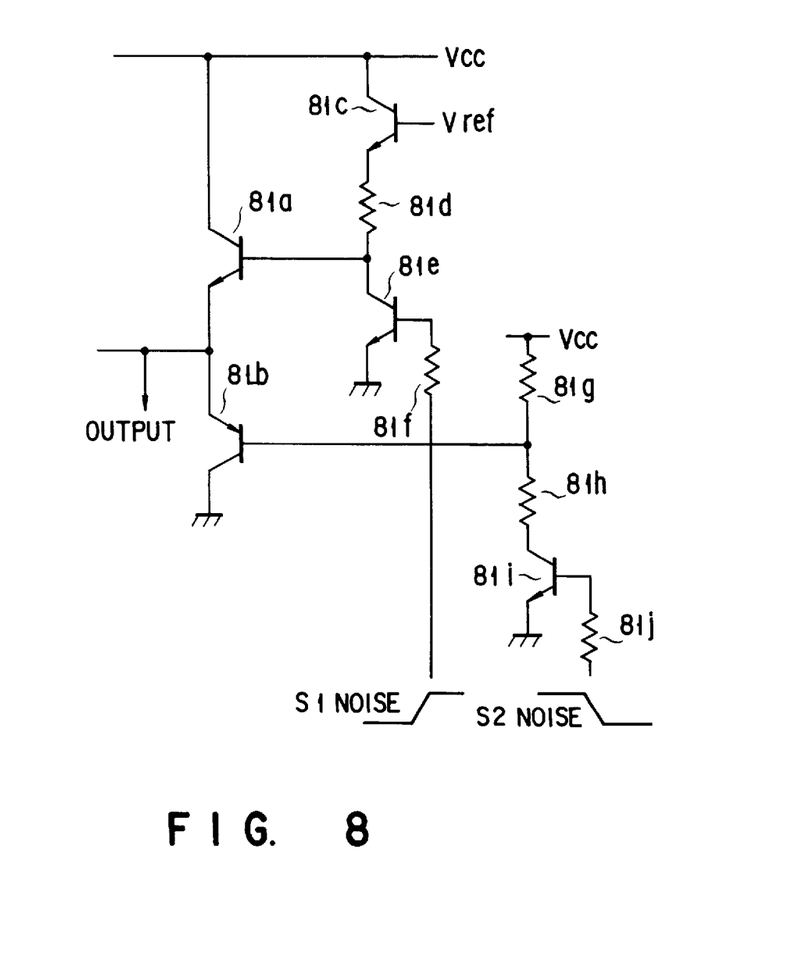
FIG. 8 is a circuit diagram specifically showing the clip circuit shown in FIG. 1.

FIG. 8 is a diagram showing an example of a large-amplitude noise clip circuit for clipping noise having a large amplitude, the noise clip circuit being included in the large amplitude noise countermeasure circuit 44. The noise clip circuit has a structure such that an NPN transistor 81a and a PNP transistor 81b are, in series, connected between the power supply voltage Vcc and the ground. A video signal is supplied to connection node N2 of the transistors 81a and 81b. Moreover, an output terminal of the video signal is connected to the connection node N2. An NPN transistor 81c, a resistor 81d and an NPN transistor 81e are, in series, connected to the power supply voltage Vcc and the ground. The reference potential Vref is supplied to a base of the transistor 81c. The connection node N2 of the resistor 81d and the NPN transistor 81e is connected to a base of the transistor 81a. First control signal S1 is supplied to a base of the transistor 81e through a resistor 81f. The first control signal S1 is a signal obtained by inverting the output signal Dout from the noise-bar-period detection circuit 30, the first control signal S1 being a signal having a low level in the noise-bar period and a high level in other periods. Moreover, resistors 81g and 81h and an NPN transistor 81j are, in series, connected between the power supply voltage Vcc and the ground. Second control signal S2 is supplied to a base of the transistor 81j through a resistor 81j. The second control signal S2 is the output signal Dout from the noise-bar-period detection circuit 30, the second control signal S2 being a signal having a high level in the noise-bar period and a low level in the other periods.

In the noise-bar period, the transistor 81e is turned off in response to the first control signal S1 so that the transistor 81a is electrically conducted by the transistor 81c. Since the transistor 81i is turned on in response to the second control signal S2, the transistor 81b is electrically conducted. Therefore, if a video signal having a large amplitude is supplied to the connection node N2, the upper portion of the signal is clipped with a level defined by the reference potential Vref. Moreover, the lower portion of the signal is clipped with a level defined by the division voltage of the resistors 81g and 81h.

Therefore, the noise clip circuit performs the clipping operation in only the noise-bar period. Even if noise having a large amplitude is generated in the noise-bar period, the amplitude of the signal can be limited within the dynamic range of the circuit following the large-amplitude noise clip circuit.

Note that the circuits after the drop out has been compensated may be controlled such that signals in the period in which the drop out is compensated are considered to be normal signals and the control is performed such that the noise-bar detection signal is masked.

Although the foregoing embodiment has been described about the VTR for recording/reproducing a video signal, the present invention may be applied to an apparatus for only reproducing a video signal.

Although the DOC 15 shown in FIG. 2 is structured to compensate the drop out of the low-frequency carrier wave FM signal, the present invention is not limited to this. The DOC 15 may compensate a demodulated video signal.

Figure 9:
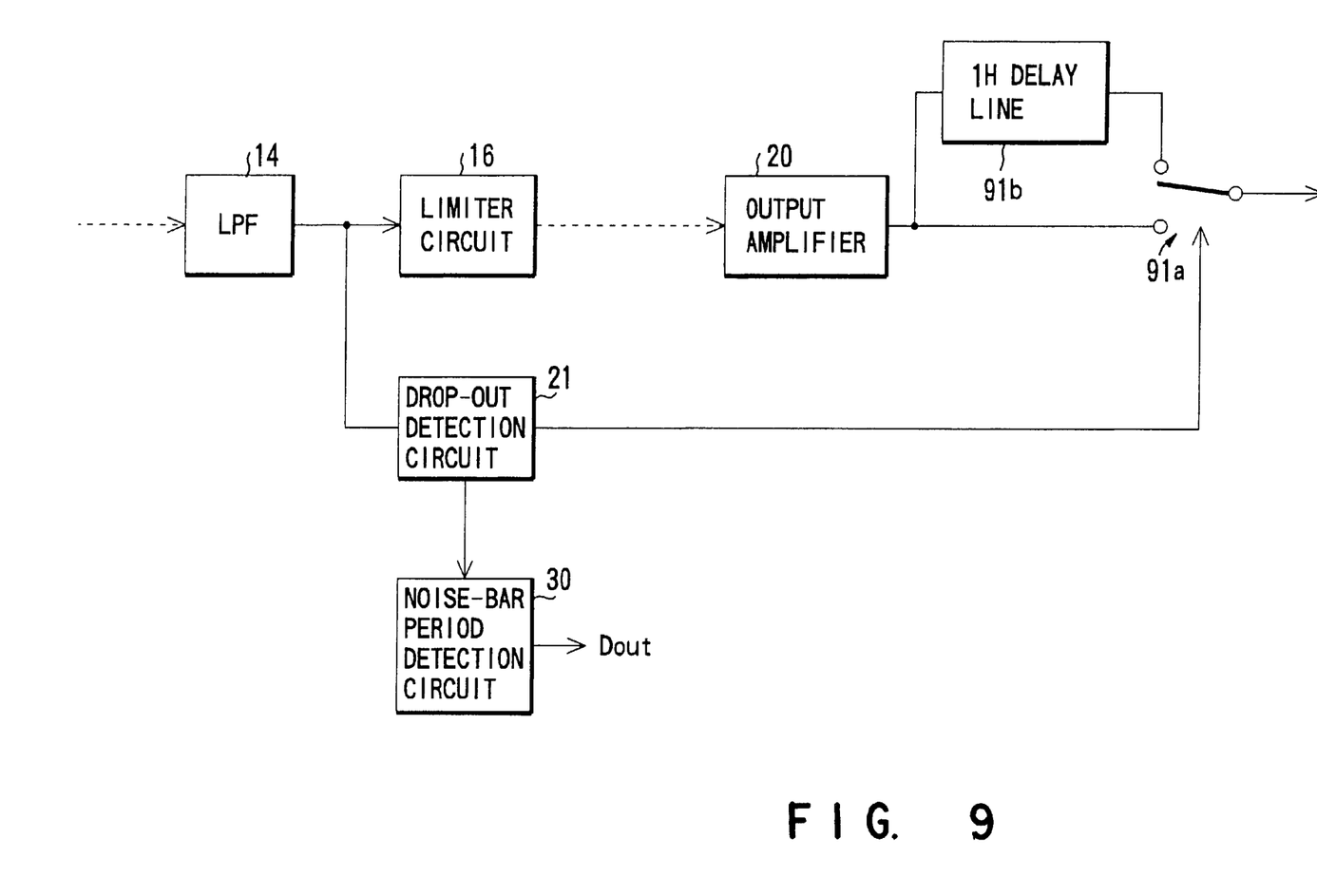
FIG. 9 is a block diagram showing a modification of the structure shown in FIGS. 1 and 2.

FIG. 9 is a diagram showing a modification of the drop-out compensation circuit. The same elements as shown in FIGS. 1 and 2 are given the same reference numerals. The drop-out detection circuit 21 detects the drop out of a low-frequency carrier wave FM signal so as to control a switch circuit 91a with a detection output signal. A 1 H delay circuit 91b is connected to, for example, an output terminal of the output amplifier 20. The 1 H delay circuit 91b delays the demodulated video signal by 1 H to supply the delayed signal to the switch circuit 91a. If drop out has been detected by the drop-out detection circuit 21, the switch circuit 91a selects the video signal delayed by the 1 H delay circuit 91b in response to the detection output signal so as to compensate the dropped out video signal. Also the foregoing drop-out compensation circuit attains an effect similar in FIG. 2.

Additional advantages and modifications will readily occur to those skilled in the art. Therefore, the invention in its broader aspects is not limited to the specific details and representative embodiments, shown and described herein. Accordingly, various modifications may be made without departing from the spirit or scope of the general inventive concept as defined by the appended claims and their equivalents.

What is claimed is:

1. A video tape reproducing apparatus comprising:
    a noise-bar period detection circuit for detecting a period of a noise bar in response to a low-frequency carrier wave FM signal contained in a signal reproduced by a video head, said nosie-bar period detection circuit being structured to output a noise-bar detection signal corresponding to the period of the noise bar;
    at least one reproduced-signal processing circuit, in the period of the noise bar, controlled in response to the noise bar detection signal output from said nosie-bar period detection circuit;
    a drop-out detection circuit for detecting drop out of the low-frequency carrier wave FM signal contained in the reproduced signal, said drop-out detection circuit including:
        an envelope reduction detection circuit for detecting a period in which the envelope of the low-frequency carrier wave FM signal contained in the reproduced signal is smaller than a predetermined amplitude so as to output a pulse signal; and
        a pulse-width elongation circuit for elongating the trailing edge of the pulse signal output from said envelope reduction detection circuit by one horizontal period or more, said pulse-width elongation circuit being structured such that when a next pulse signal is supplied from said envelope reduction detection circuit in a period in which said pulse-width elongation circuit is elongating the trailing edge of the pulse signal, said pulse-width elongation circuit elongates the pulse width by using the trailing edge of the new pulse signal as a reference so as to generate a drop-out detection signal.

2. An apparatus according to claim 1, wherein
said noise-bar period detection circuit comprises:
an integration circuit which receives the drop-out detection signal output from said drop-out detection circuit so as to integrate the drop-out detection signal; and
a circuit which shapes the waveform of an output signal from said integration circuit so as to output a noise-bar detection signal.

3. An apparatus according to claim 1, further comprising:
a delay circuit for delaying the low-frequency carrier wave FM signal by one horizontal period; and
a switch circuit-for inserting the low-frequency carrier wave FM signal delayed by said delay circuit into a portion in which drop out takes place in response to the drop-out detection signal output from said drop-out detection circuit.

4. An apparatus according to claim 1, wherein
said reproduced-signal processing circuit is a clamp circuit for clamping the level of a synchronizing signal of the low-frequency carrier wave FM signal, said clamp circuit being structured to, in the noise bar period, maintain a normal clamp potential realized immediately before the noise bar period in response to the noise-bar detection signal supplied from said noise-bar period detection circuit.

5. An apparatus according to claim 1, wherein
said reproduced-signal processing circuit is an automatic gain control circuit for automatically adjusting the gain of an amplifying circuit while monitoring the level of the reproduced signal, said automatic gain control circuit being structured to, in the noise bar period, maintain a normal control signal level realized immediately before the noise bar period in response to the noise-bar detection signal supplied from said noise-bar period detection circuit.

6. An apparatus according to claim 1, wherein
said reproduced-signal processing circuit is a mode determination circuit for determining a mode for processing the reproduced signal, said mode determination circuit being structured to, in the noise bar period, maintain a normal determination output obtained immediately before the noise bar period in response to the noise-bar detection signal supplied from said noise-bar period detection circuit.

7. An apparatus according to claim 1, wherein
said reproduced-signal processing circuit is a large-amplitude noise clip circuit for clipping noise having a large amplitude contained in the reproduced signal, said large-amplitude noise clip circuit being structured to clip noise having a large amplitude only in the noise bar period in response to the noise-bar detection signal supplied from said noise-bar period detection circuit.

8. A video tape reproducing apparatus comprising:
drop-out detection circuit for detecting a drop out generated in a low-frequency carrier wave FM signal contained in a reproduced signal when a video tape is reproduced in a special mode, wherein
said drop-out detection circuit comprises:

an envelope reduction detection circuit which detects a period in which the envelope of the low-frequency carrier wave FM signal is smaller than a predetermined amplitude so as to output a pulse signal; and a pulse-width elongation circuit for elongating the trailing edge of the pulse signal output from said envelope reduction detection circuit, said pulse-width elongation circuit being structured such that when a next pulse signal is supplied from said envelope reduction detection circuit in a period in which said pulse-width elongation circuit is elongated the trailing edge of the pulse, said pulse-width elongation circuit elongates the pulse width by using the trailing edge of the new pulse signal;

a noise-bar period detection circuit for detecting a period of a noise bar in response to an output signal from said drop-out detection circuit so as to output a noise-bar detection signal; and at least one reproduced-signal processing circuit which is controlled in the period of the noise bar in response to the noise-bar detection signal output from said noise-bar period detection circuit.

9. An apparatus according to claim 8, wherein said noise-bar period detection circuit comprises:

an integration circuit which receives the detection signal from said drop-out detection circuit so as to integrate the detection signal; and a circuit which shapes the waveform of an output signal from said integration circuit so as to output the noise-bar detection signal.

10. An apparatus according to claim 8, wherein said reproduced-signal processing circuit is a clamp circuit for clamping the level of a synchronizing signal of the low-frequency carrier wave FM signal, said clamp circuit comprises:

an input circuit to which the low-frequency carrier wave FM signal is supplied and which includes a variable constant-current source circuit;

a comparator for subjecting output voltage from said input circuit and a reference voltage to a comparison to control said variable constant-current source circuit with an output potential corresponding to a result of the comparison;

a switch circuit for controlling the operation of said comparator in response to the noise-bar detection signal supplied from said noise-bar period detection circuit; and a capacitor for accumulating output potentials from said comparator, and said capacitor, in the noise-bar period, maintains a normal potential output from said comparator and realized immediately before the noise-bar period.

11. An apparatus according to claim 8, wherein said reproduced-signal processing circuit is an automatic gain control circuit for automatically adjusting the level of the reproduced signal, said automatic gain control circuit comprising:

a voltage control amplifier to which the low-frequency carrier wave FM signal is supplied;

a detector which detects the level of a signal output from said voltage control amplifier in accordance with reference voltage so as to output voltage for controlling said voltage control amplifier;

a switch circuit for controlling the operation of said detector in response to the noise-bar detection signal supplied from said noise-bar period detection circuit; and a capacitor for accumulating control voltage output from said detector, and said capacitor, in the noise bar period, maintains normal control voltage immediately before the noise bar period output from said detector.

12. An apparatus according to claim 8, wherein said reproduced-signal processing circuit is a mode determination circuit for determining a mode for processing the reproduced signal, said mode determination circuit comprising:

a detector to which the low-frequency carrier wave FM signal is supplied, which detects the frequency of the low-frequency carrier wave FM signal and which outputs voltage corresponding to the detected frequency;

a comparator which subjects voltage output from said detector and reference voltage to a comparison so as to determine the mode;

a switch circuit for controlling the operation of said detector in response to the noise-bar detection signal supplied from said noise-bar period detection circuit; and a capacitor for accumulating voltage output from said detector, said capacitor being structured to, in the noise bar period, maintains normal voltage immediately before the noise bar period output from said detector.

13. An apparatus according to claim 8, wherein said reproduced-signal processing circuit is a large-amplitude noise clip circuit for clipping noise having a large amplitude generated in the reproduced signal, said large-amplitude noise clip circuit comprising:

a first clip circuit for clipping the upper portion of the reproduced signal in only the noise bar period in response to the noise-bar detection signal supplied from said noise-bar period detection circuit; and a second clip circuit for clipping the lower portion of the reproduced signal in only the noise bar period in response to the noise-bar detection signal supplied from said noise-bar period detection circuit.

14. A video tape reproducing apparatus comprising:

a drop-out detection circuit for detecting drop out generated in a low-frequency carrier wave FM signal contained in a reproduced signal when a video tape is reproduced in a special mode, said drop-out detection circuit comprising:

an envelope reduction detection circuit which detects a period in which the envelope of the low-frequency carrier wave FM signal is smaller than a predetermined amplitude so as to output a pulse signal; and a pulse-width elongation circuit for elongating the trailing edge of the pulse signal output from said envelope reduction detection circuit, said pulse-width elongation circuit being structured such that when a next pulse signal is supplied from said envelope reduction detection circuit in a period in which said pulse-width elongation circuit is elongated the trailing edge of the pulse, said pulse-width elongation circuit elongates the pulse width by using the trailing edge of the new pulse signal;

a noise-bar period detection circuit for detecting a period of a noise bar in response to an output signal from said drop-out detection circuit so as to output a noise-bar detection signal;

at least one reproduced-signal processing circuit which is controlled in the period of the noise bar in response to the noise-bar detection signal output from said noise-bar period detection circuit;

a demodulation circuit for demodulating the low-frequency carrier wave FM signal;

a delay circuit for delaying signal demodulated by said demodulation circuit by one horizontal period; and a switch circuit for inserting the signal delayed by said delay circuit into a portion in which the drop out has been generated in response to an output signal from said drop-out detection circuit.

15. An apparatus according to claim 14, wherein said reproduced-signal processing circuit is a clamp circuit for clamping the level of a synchronizing signal of the low-frequency carrier wave FM signal, said clamp circuit comprising:

an input circuit to which the low-frequency carrier wave FM signal is supplied and which includes a variable constant-current source circuit;

a comparator for subjecting output voltage from said input circuit and reference voltage to a comparison so as to control said variable constant-current source circuit with an output potential corresponding to a result of the comparison;

a switch circuit for controlling the operation of said comparator in response to the noise-bar detection signal supplied from said noise-bar period detection circuit; and a capacitor for accumulating output potentials from said comparator, said capacitor being structured to, in the noise bar period, maintain a normal potential realized immediately before the noise bar period output from said comparator.

16. An apparatus according to claim 14, wherein said reproduced-signal processing circuit is an automatic gain control circuit for automatically adjusting the level of the reproduced signal, said automatic gain control circuit comprising:

a voltage control amplifier to which the low-frequency carrier wave FM signal is supplied;

a detector for detecting the level of a signal output from said voltage control amplifier in accordance with reference voltage to output control voltage for said voltage control amplifier;

a switch circuit for controlling the operation of said detector in response to the noise-bar detection signal supplied from said noise-bar period detection circuit; and a capacitor for accumulating control voltage output from said detector, said capacitor being structured to, in the noise bar period, maintain normal control voltage immediately before the noise bar period output from said detector.

17. An apparatus according to claim 14, wherein said reproduced-signal processing circuit is a mode determination circuit for determining a mode for processing the reproduced signal, said mode determination circuit comprising:

a detector to which the low-frequency carrier wave FM signal is supplied, which detects the frequency of the low-frequency carrier wave FM signal and which outputs voltage corresponding to the detected frequency;

a comparator for subjecting voltage output from said detector and reference voltage to a comparison to determine the mode;

a switch circuit for controlling the operation of said detector in response to the noise-bar detection signal supplied from said noise-bar period detection circuit; and a capacitor for accumulating voltage output from said detector, said capacitor being structured to, in the noise bar period, maintain normal voltage immediately before the noise bar period output from said detector.

18. An apparatus according to claim 14, wherein said reproduced-signal processing circuit is a large-amplitude noise clip circuit for clipping noise having a large amplitude generated in the reproduced signal, said large-amplitude noise clip circuit comprising:

a first clip circuit for clipping the upper portion of the reproduced signal in only the noise bar period in response to the noise-bar detection signal supplied from said noise-bar period detection circuit; and a second clip circuit for clipping the lower portion of the reproduced signal in only the noise bar period in response to the noise-bar detection signal supplied from said noise-bar period detection circuit.

19. A signal processing circuit for processing a reproduced signal reproduced from a video tape, comprising:

a drop-out detection circuit configured to detect drop out of the low-frequency carrier wave FM signal contained in the reproduced signal, said drop-out detection circuit outputting a drop-out detection signal in response to the drop out, wherein said drop-out detection circuit comprising:

an envelope reduction detection circuit configured to detect a period in which the envelope of the low-frequency carrier wave FM signal contained in the reproduced signal is smaller than a predetermined amplitude so as to output a pulse signal; and a pulse-width elongation circuit configured to elongate the trailing edge of the pulse signal output from said envelope reduction detection circuit by one horizontal period or more, said pulse-width elongation circuit being structured such that when a next pulse signal is supplied from said envelope reduction detection circuit in a period in which said pulse-width elongation circuit is elongating the trailing edge of the pulse signal, said pulse-width elongation circuit elongating the pulse width by using the trailing edge of the new pulse signal as a reference so as to generate the drop-out detection signal;

a noise-bar period detection circuit configured to detect a period of a noise bar in response to the drop-out detection signal supplied from the drop-out detection circuit, said noise-bar period detection circuit outputting a noise-bar detection signal corresponding to the period of the noise bar; and at least one reproduced-signal processing circuit controlled, in the period of the noise bar, in response to the noise-bar detection signal supplied from the noise-bar period detection circuit.

20. A circuit according to claim 19, wherein said noise-bar period detection circuit comprises:

an integration circuit which receives the drop-out detection signal output from the dropout detection circuit so as to integrate the drop-out detection signal; and a circuit which shapes the waveform of an output signal from said integration circuit so as to output a noise-bar detection signal.

21. A circuit according to claim 19, wherein said reproduced-signal processing circuit is a clamp circuit configured to clamp the level of a synchronizing signal of the low-frequency carrier wave FM signal, said clamp circuit being structured to, in the noise bar period, maintain a normal clamp potential realized immediately before the noise bar period in response to the noise-bar detection signal supplied from said noise-bar period detection circuit.

22. A circuit according to claim 19, wherein said reproduced-signal processing circuit is an automatic gain control circuit configured to adjust automatically the gain of an amplifying circuit while monitoring the level of the reproduced signal, said automatic gain control circuit being structured to maintain, in the noise bar period, a normal control signal level realized immediately before the noise bar period in response to the noise-bar detection signal supplied from said noise-bar period detection circuit.

23. A circuit according to claim 19, wherein said reproduced-signal processing circuit is a mode determination circuit configured to determine a mode for processing the reproduced signal, said mode determination circuit being structured to maintain, in the noise bar period, a normal determination output obtained immediately before the noise bar period in response to the noise-bar detection signal supplied from said noise-bar period detection circuit.

24. A circuit according to claim 19, wherein said reproduced-signal processing circuit is a large-amplitude noise clip circuit configured to clip noise having a large amplitude contained in the reproduced signal, said large-amplitude noise clip circuit being structured to clip noise having a large amplitude only in the noise bar period in response to the noise-bar detection signal supplied from said noise-bar period detection circuit.

* * * * *